Dec. 23, 1930.    W. C. CARPENTER    1,785,827
FUEL BRIQUETTE FORMING AND BAKING MACHINE
Filed Feb. 14, 1928    4 Sheets-Sheet 2
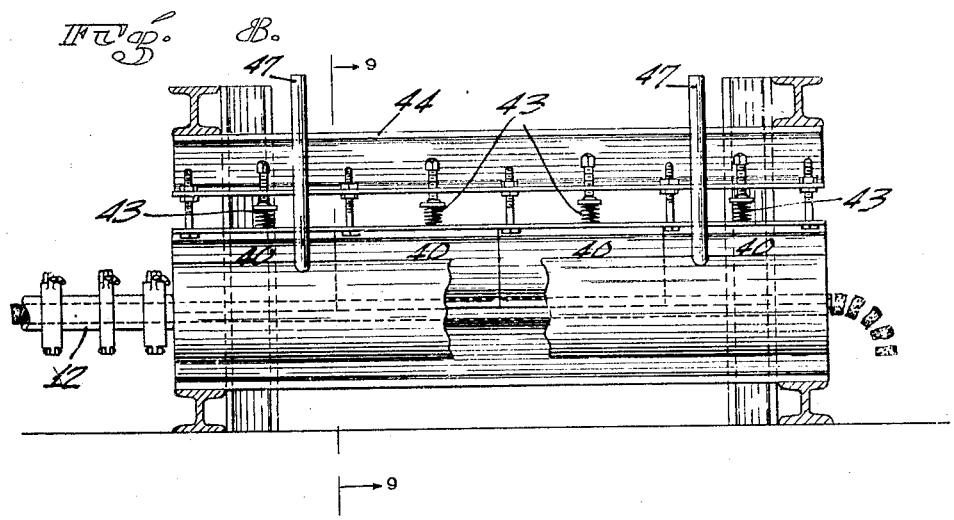
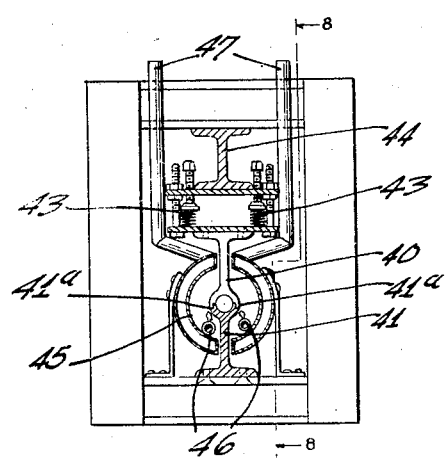
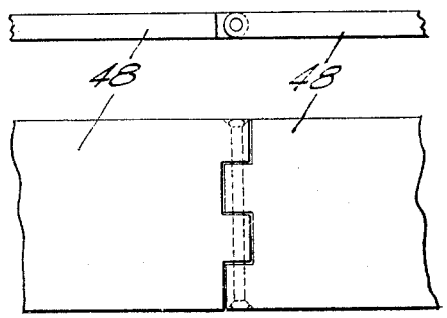
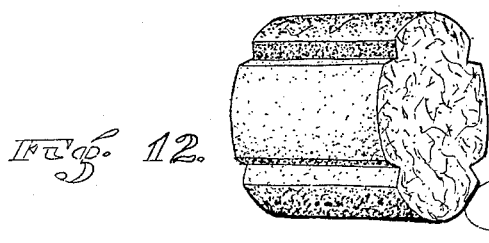
INVENTOR
WM. C. CARPENTER
BY
ATTORNEY

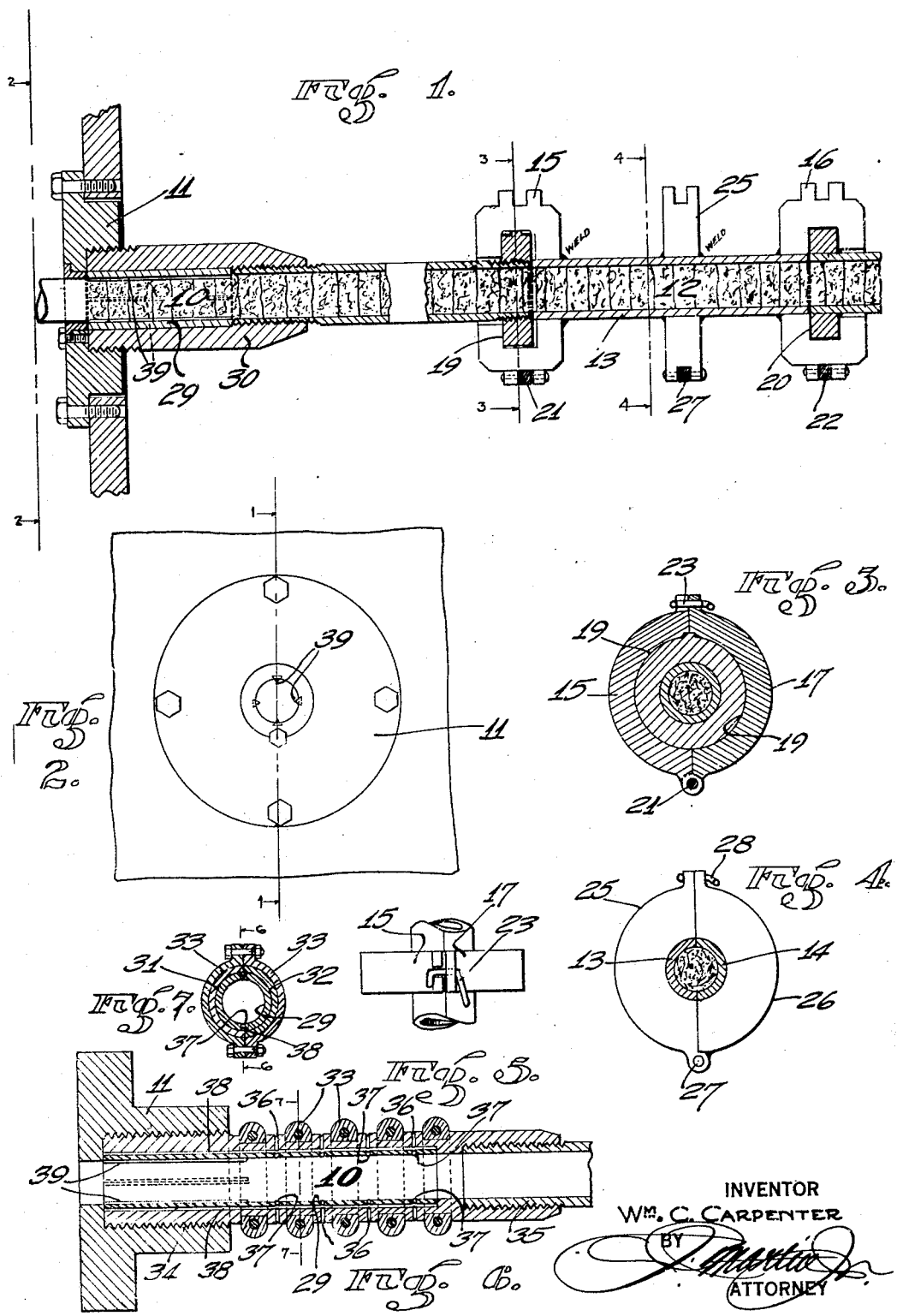

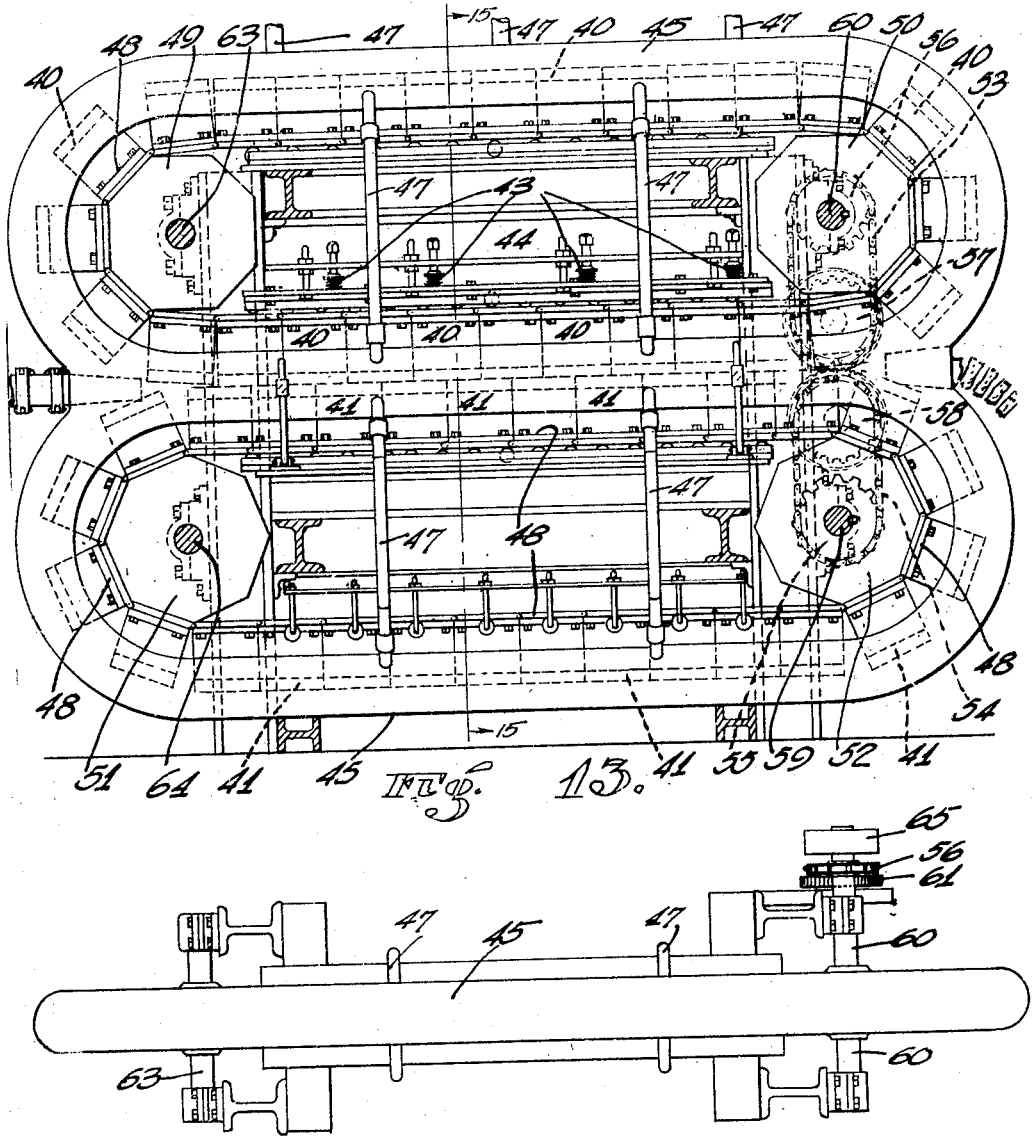

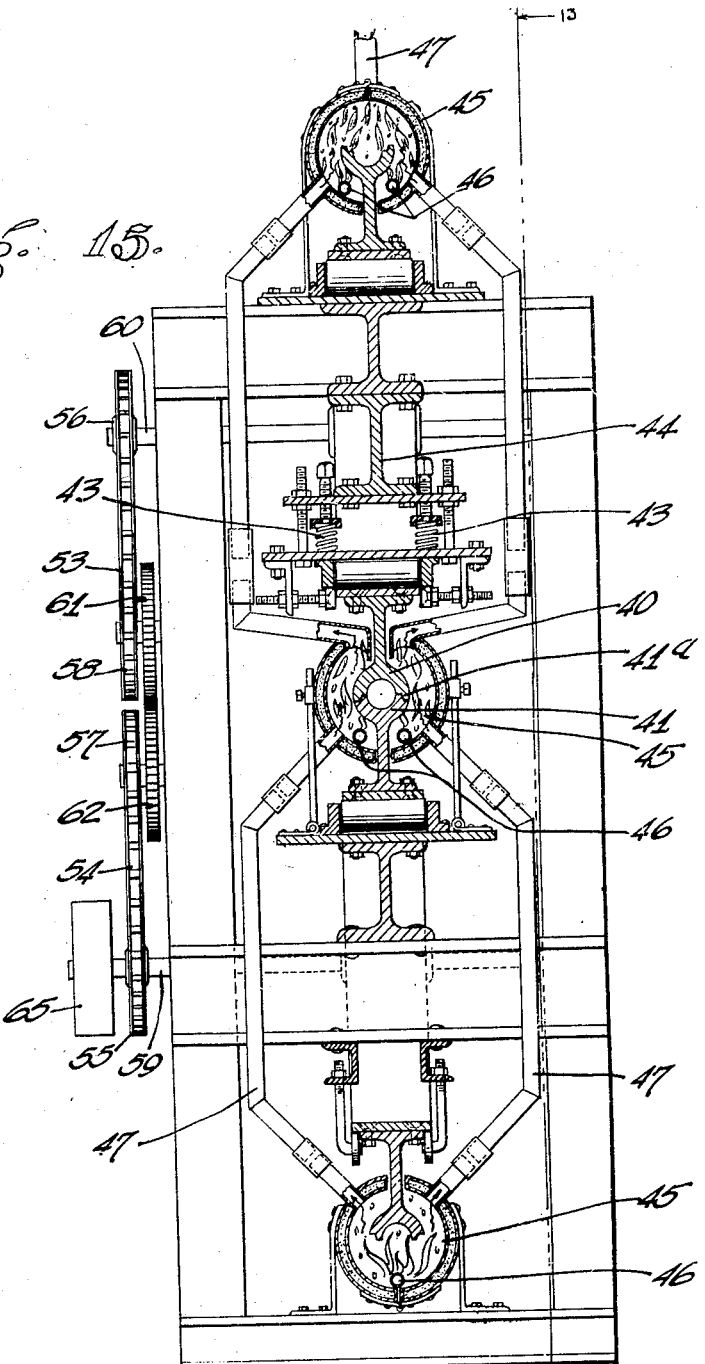

Patented Dec. 23, 1930

1,785,827

UNITED STATES PATENT OFFICE

WILLIAM C. CARPENTER, OF SAN FRANCISCO, CALIFORNIA

FUEL-BRIQUETTE FORMING AND BAKING MACHINE

Application filed February 14, 1928. Serial No. 254,237.

The hereinafter described invention relates to that class of apparatus wherein carbonaceous material such as coal, lignite, peat and wood in relatively finely comminuted state is fed, formed, baked and discharged as briquettes suitable for fuel.

Among the objects of the invention is the provision in a fuel briquette machine of a conduit between the forming die and the baking die thereof which is portable and releasably confined in communication with the forming and baking dies in such manner that it can be readily removed and a charge of carbonaceous material packed or clogged in the forming or baking die, or in fact the conduit itself, as frequently happens during the operation of the machine, can be expeditiously eliminated, the conduit quickly replaced and the briquetting operation continued without serious delay and shut-down, making for an efficiency not now obtainable in machines of this character.

An object of my invention is to provide through a releasably confined conduit section located between the forming and baking dies of a fuel briquetting machine, means which upon removal thereof will permit of the operation of the forming die only so that the character of the briquette column extruded therethrough may be observed and its compressibility and suitability for baking determined before it is allowed to continue on through the conduit connection into the baking die.

Another object of my invention is to provide a baking die or dies which will automatically separate by reason of the compression of the material within the die or dies so that a perceptible opening or relief will be effected in the dies and the strain incident to the compression of the material passing therethrough causing breakage and failure of same is alleviated.

A further object of my invention is to provide a baking die structure in which a relief or compensation for the expansion of the carbonaceous material as delivered therein from the forming die will be effected at intervals along the die length by a plurality of self adjusting die units.

Another object of my invention is to provide means in a baking die construction for the carbonization of finely comminuted material, automatically allowing a slight increase in the normal size of the die to relieve the stress set up in the die by the material passing therethrough due either to its compression upon delivery from the forming die or to expansion occasioned by the heating or baking of the material within the die itself, and furthermore to provide means for withdrawing the vapors liberated by the heating and utilizing them to supply heat for the baking operation either in whole or part.

Another object of my invention is to provide a baking die for the curing or binding of compressed carbonaceous material delivered therein in which a single die or a plurality of die units comprising the total length of the die will permit of separation axially during the baking operation and to make the die preferably in halves and so that the separation of the die or units thereof will be in a plane substantially horizontal to the axis of the die; and furthermore so that after the die as comprised of units has completed its function of baking, the halves or sections thereof will separate and cause the ejection finally of the carbonized or baked material and the half sections will be brought together in the provision of a full die unit or units for the reception of the compressed material from the forming die, affording a continuous means of receiving, baking and ejecting the compressed carbonaceous material from the forming die.

Another object of my invention is to provide in a plurality of baking die units for curing compressed carbonaceous material in the formation of briquettes, two continuously moving chains of half or part die sections which when brought together form a baking die of full section, capable of receiving and ejecting the compressed carbonaceous material as discharged from the forming die.

Another object of my invention is to provide a linked baking die construction in which links traveling over oppositely rotating members adapted to engage them, form, when brought together, the baking die, and in which the links during the time they are together in the formation of the baking die pass through a heated chamber to effect the carbonization of the material passed through them from the forming die.

A further object of my invention is to provide a construction employing two chains of half die sections moving over pulleys adapted to rotate in oppositely disposed directions, and so that when the half die sections are brought together they form a continuously moving full die section, and to pass the continuously moving full die section through a heated chamber in effecting the carbonization of the material passing therethrough.

Another object of my invention is to provide a reinforced sectional forming die with removable liner therein and to vent the liner of the die to the atmosphere so as to relieve fluid pressure as built up therein during the compression of the finely comminuted carbonaceous material, thereby making an improved forming die suitable for heavy duty which can be quickly and inexpensively repaired as the demands of service may dictate.

Another object of my invention is to provide in a briquette forming machine a self-adjusting baking die which will relieve or compensate the expansion of the material passing therethrough, due to its heating, and which on account of the relief afforded will act to reduce the excessive initial pressure now placed upon the forming die as when the latter is required to force a column of compressed carbonaceous material through a solid or non-giving baking die, thereby preventing the breakage of the forming die and reducing to a minimum its cost of construction through the elimination of the excessively heavy parts now required in its formation to withstand the strains placed upon it.

Other objects of my invention will readily make themselves manifest to those skilled in the art.

In order to fully understand the invention, reference is made to the accompanying drawings, in which, Fig. 1 is a broken longitudinal section showing the forming die and the releasably confined conduit joining it to the baking die, connected together by hinged union couplings engaging shoulders on the respective dies, a charge of carbonaceous material being shown passing through the forming die and conduit into the shoulder connection of the baking die.

Fig. 2 is an end view of the forming die holding means showing groove forming projection for forming vents in the briquettes and through which the vapors as distilled off the carbonaceous material during the baking operation are vented and their retarding effect relieved.

Fig. 3 is a section taken on line 3—3, Fig. 1.

Fig. 4 is a section taken on line 4—4, Fig. 1.

Fig. 5 shows the form of clamp as employed for holding the hinged union couplings of the releasably confined conduit section.

Fig. 6 illustrates in longitudinal section a different construction of forming die than that shown in Fig. 1, a liner being encased in a split sleeve which latter is held together in close engagement with the liner by removable bands that serve as reinforcing rings. In this form of construction the die is shown vented to the atmosphere through communicating openings between the liner and sleeve.

Fig. 7 is a section taken on line 7—7, Fig. 6, while Fig. 6 is a section taken on line 6—6, Fig. 7.

Fig. 8 is a side elevation partly in section of one form of my improved baking die showing its adjustable or compensating die units in the form of half sections held in engagement by springs, and heating chamber surrounding the die.

Fig. 9 is a section taken on line 9—9, Fig. 8, showing the self-adjusting die sections encased in the heating chamber with fuel feed inlets and vents from the heating chamber leading to the atmosphere.

Fig. 10 shows the side view of the linked plates or carriers upon which the half die sections are mounted.

Fig. 11 is a plan view of Fig. 10.

Fig. 12 illustrates a section of the baked briquette as discharged with grooves in same through which the gases or vapors as distilled off the carbonaceous material during the baking operation may be vented.

Fig. 13 is a side elevation of my improved baking die construction in which part die sections are shown linked together in the form of two chains with transmission means causing the chains of part die sections to move in opposite directions and to be brought together to form a continuously moving full die section, a heating chamber or housing being shown encasing the dies.

Fig. 14 is a plan view of Fig. 13.

Fig. 15 is an end elevation taken on line 15—15, Fig. 13, while Fig. 13 is a side elevation taken on line 13—13, Fig. 15. Fig. 15 shows the half or part die sections as brought together in the center in the formation of a continuously moving full die section, the illustration showing how half die sections pass over the top of the full die sections and how the half die sections are adjustably held together with springs in the formation of the continuously moving die, to permit the sections thereof to automatically compensate an increase in size of the carbonaceous material passing through the die.

In the drawings, numeral 10 denotes the forming die as connected by threaded holder 11 to the source of supply of finely comminuted carbonaceous material. Numeral 12 denotes the conduit section as releasably confined between the forming die and the baking die.

The conduit 12 in the present illustration of my invention is made in halves, 13 and 14. Welded or otherwise suitably secured to the ends of half conduit sections 13 and 14 are half coupling members 15, 16, 17 and 18. The ends of the forming die and baking die are provided with annular shoulders, 19 and 20 respectively.

Half coupling members 15, 16, 17 and 18 are recessed to accommodate the shoulders 19 and 20, and hinged together at 21 and 22, respectively. Lock bolts 23 and 24 opposite the hinges 21 and 22 respectively, engage lugs on coupling members 15, 16, 17 and 18 so that when half conduit sections 13 and 14 are placed around the annular shoulders 19 and 20 and the bolts 23 and 24 locked, the full conduit section 12 is held in releasably confined engagement between the ends of the forming and baking dies.

The half conduit sections coupled in this manner provide ready removal and easy access for cleaning. A reinforcing ring made in halves 25 and 26 welded to the half conduit sections 13 and 14 in like manner as the welded half couplings 15, 16, 17 and 18, is also provided for conduit 12. The halves 25 and 26 are hinged together at 27 and locked by bolt 28.

Forming die 10 as shown in Fig. 1, comprises a liner 29, encased within a solid housing or bushing 30, whereas in Figs. 6 and 7 the die 10 is shown as formed with a split housing or bushing as denoted by numerals 31 and 32. In the latter construction the split housing is retained in position around the liner 29, by bolted clamps 33 which serve as removable reinforcing bands. The liner housing sections 31 and 32 as threaded at 34 and 35 provide for the attachment of die into position.

Holes 36 through split housing members 31 and 32 communicate with holes 37, through liner 29 by longitudinally extending grooves 38 on the exterior surface of liner 29.

Numeral 39, denotes longitudinal projections extending from the inner surface of liner 29, for the formation of grooves in the compressed carbonaceous material passing through the forming die 10.

Figs. 8 and 9 illustrate one form of my baking die in which numerals 40 and 41 denote the separable die sections resiliently held together in the formation of a full die opening 42 by springs 43 mounted in carrier 44. In this construction the bottom die section comprises a single unit 41, while the upper die section comprises a plurality of units, 40.

Numeral 45 denotes the heating chamber surrounding the resiliently held die sections 40 and 41, and 46 the fuel feed pipes for heating chamber 45. Die sections 40 and 41 are guided in movable contact with each other by tongues and grooves formed between said sections as noted at 41ª. Waste products of combustion from heating chamber 45 are removed through vent pipes 47.

Figs. 13, 14 and 15 illustrate the form of my improved baking die in which a plurality of die sections 40 and 41 are mounted on linked plates, 48, (as illustrated by Figs. 10 and 11), which serve as carriers for the die sections. Transmission of the linked plates 48 is made over rotatable members 49, 50, 51 and 52 provided with flat faces adapted to engage the flat faces of the linked plates. Rotatable members 50 and 52 are driven by sprocket chains 53 and 54 respectively, riding over sprocket wheels 55, 56, 57 and 58. Shaft 59, of rotatable member 52 carries sprocket wheel 55, and shaft 60 of rotatable member 50 carries sprocket wheel 56. Gear wheels 61 and 62 meshed between sprocket wheels 57 and 58 are used to cause a rotation of shafts 59 and 60, and the rotatable members 52 and 50 secured thereto in oppositely disposed directions.

Rotatable members 49 and 51 are so mounted by their respective shafts 63 and 64 and in respect to rotatable members 50 and 52 mounted by their shafts 60 and 59 respectively, that upon rotation of shaft 59 by drive pulley 65 the part die sections 40 and 41 are brought into movable engagement in the formation of a continuously moving full die section, the die sections being resiliently held together during their movement by springs 43 mounted in carrier 44.

Heating chamber 45 completely encases the die sections, and heat for effecting the carbonization of the material passing through the continuously moving resiliently held die sections 40 and 41 is supplied through fuel feed pipes 46.

I desire it to be understood that reasonable modification of my invention may be made by those skilled in the art without departing from its principles as herein set out.

What I claim is:

1. In a briquette machine, a forming die comprising a liner, a sectional housing enclosing said liner, reinforcing bands for retaining the sections of said housing in position around said liner and vents in the liner communicating with openings through said housing.

2. In a briquette machine, a forming die comprising a liner, a sectional sleeve encasing said liner, threaded ends on said sleeve, bands for retaining said sleeve in engagement with said liner and holding the threads on the ends of said sectional sleeve in alignment and openings between said liner and sectional sleeve providing vents.

3. In a briquette machine, a forming die, a baking die, a conduit between the forming and baking dies comprising a plurality of longitudinally extending sections and coupling members on the ends of the said sections adapted to engage complementary abutments on said forming and baking dies.

4. In a briquette machine and the forming and baking dies thereof, a removable conduit section interposed between said dies comprising longitudinally extending hinged elements, abutments on said baking and forming and forming dies and coupling members on the ends of said elements adapted to engage said abutments and hold the bore of said conduit substantially in alignment with the bores of said forming and baking dies.

5. In a briquette machine, a forming die, a baking die, a removable conduit section between the forming and baking dies comprising half sections, half coupling members on either end of said sections, hinges between the half coupling members and clamps for retaining the hinged coupling members together.

6. In a briquette machine, a baking die comprising a conduit of separable units, means for resiliently holding said units together in conduit section and means for heating said units to effect the carbonization of the material passing therethrough.

7. In a briquette machine, a baking die comprising a plurality of longitudinally disposed connecting die units, means for holding said units in self-adjusting contact with each other in the formation of a fully enclosed conduit and means for heating said conduit to effect the carbonization of the material passing therethrough.

8. In a briquette machine, a baking die comprising part sections, resilient means coacting with said sections to hold them together in the formation of a fully enclosed conduit, said means permitting separation of said sections axially and means for heating said sections during their engagement in conduit form.

9. In a briquette machine, a baking die comprising a plurality of part die units, means for transmitting movement to said units, means for resiliently holding said units together in the formation of a fully enclosed traveling conduit and means for heating said conduit to effect the carbonization of the material passing therethrough.

10. In a briquette machine, a baking die comprising two chains of die units in half conduit form, transmission means for moving said chains into engagement with each other in the formation of a full conduit and means for heating said die units during their engagement in full conduit form.

In testimony whereof, I have hereunto set my hand at San Francisco, California, this 8th day of February, 1928.

WILLIAM C. CARPENTER.